July 27, 1948.　　　P. H. SLEEPER　　　2,445,865
CASTER WHEEL LOCK
Filed April 28, 1947

INVENTOR.
PAUL H. SLEEPER
BY
ATTORNEY

Patented July 27, 1948

2,445,865

UNITED STATES PATENT OFFICE 2,445,865

CASTER WHEEL LOCK

Paul H. Sleeper, Albion, Mich., assignor to Domestic Credit Corporation, Chicago, Ill.

Application April 28, 1947, Serial No. 744,289

7 Claims. (Cl. 16—35)

This invention relates to improvements in caster wheel lock.

The main objects of this invention are:

First, to provide a caster wheel for work benches, tables, racks, tool cabinets, and various other purposes in which the wheel standard and the wheel may be locked against rotation and by a single movement and simultaneously released by the same means.

Second, to provide a caster wheel in which the parts may be locked in any position.

Third, to provide a caster wheel having these advantages which is simple and economical and one in which a single element functions both to lock the standard and to brake the wheel.

Objects relating to details and economies of the invention will appear from the description to follow. The invention is defined and pointed out in the claims.

A preferred embodiment of the invention is illustrated in the accompanying drawing, in which.

Figures 1, 2, 3, 4, 5, 6:
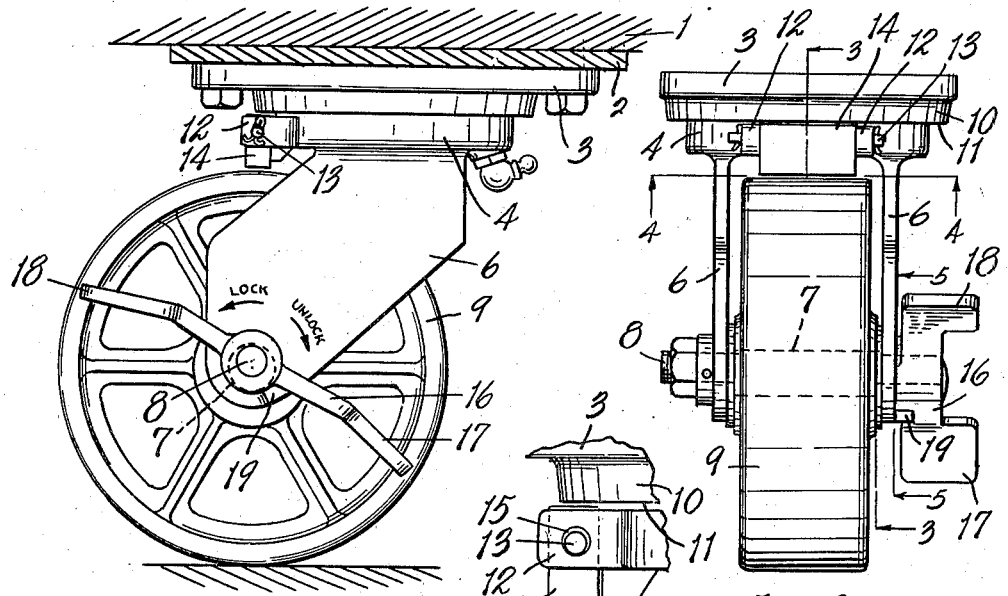
Fig. 1 is a fragmentary elevational view of a structure embodying the features of my invention, the standard and wheel being shown in side elevation.
Fig. 2 is an elevation of the caster wheel structure viewed from the left of Fig. 1.
Fig. 3 is an enlarged fragmentary view mainly in section on broken line 3—3 of Fig. 2.
Fig. 4 is a horizontal section on line 4—4 of Fig. 2.
Fig. 5 is a fragmentary view on line 5—5 of Fig. 2 showing details of the spindle and its mounting.
Fig. 6 is a fragmentary view with parts in released position.

In the accompanying drawing 1 represents a part mounted on a caster wheel, 2 representing a frame or bed piece thereof.

My improved caster comprises a base member 3 on which the standard 4 is swivelly mounted, the swivel or king bolt being shown at 5 in Fig. 4. The standard is forked, being provided with forks 6, carrying the spindle 7 which has eccentric portions 8 rotatably mounted in the arms. The wheel 9 is mounted on the spindle, the eccentric engagement of the spindle with the standard permitting the raising and lowering of the standard relative to the wheel.

The base member 3 is provided with an annular flange 10, the face 11 of which constitutes a downwardly facing clutch surface or face.

The standard is provided with laterally projecting spaced ears 12 receiving the pin 13 extending from the combined block-like wheel brake and standard clutch or lock member 14. The holes 15 in the ears receiving the pin 13 permit vertical movement of the member 14 so that it may be actuated or shifted into locking engagement with the base member as shown in Fig. 3 in which position it is also in braking engagement with the wheel or it may be supported by the pin in completely neutral position as to both the wheel and the base member, as shown in Fig. 5.

The foot pedal 16 is provided with foot pieces or treads 17 and 18 and is connected to the spindle so that a down thrust on the pedal or foot piece 18 rotates the spindle in locking direction and a thrust on the foot piece 17 rotates the spindle to unlocking and brake releasing position. Stop 19 is provided to limit the rotation of pedal 16.

When the parts are in locked position, the wheel engages the member 14, forcing it into engagement with the clutch surface of the caster base member, at least a substantial part of the load being sustained by the member 14 so that a very effective braking of the wheel and locking of the wheel standard results.

I have illustrated and described my invention in an embodiment thereof which I consider highly practical. I have not attempted to illustrate or describe other embodiments or adaptations which I contemplate as it is believed that this disclosure will enable those skilled in the art to embody or adapt my invention as may be desired.

Having thus described my invention, what I claim as new and desire to secure by Letters Patent, is:

1. In a caster, the combination with a base member provided with an annular downwardly facing flange, the edge of the flange constituting a clutch face, of a wheel, a forked wheel standard swiveled on said base member, a spindle for said wheel having eccentric portions at the ends thereof rotatably mounted in the forks of said standard, a block-like combined wheel brake and standard lock member mounted on said standard below said flange on said base member for limited vertical movement, said member being normally out of engagement with said clutch face of said base member and the periphery of the wheel, rotation of the spindle on its eccentric portions in one direction acting to engage the wheel with the said member and through such engagement shift it into engagement with said clutch face of said base member, and an actuating lever secured to one end of said spindle and having tread portions at each end thereof.

2. In a caster, the combination with a base member provided with a downwardly facing clutch surface, of a wheel, a forked wheel standard swiveled on said base member, a spindle for said wheel having eccentric portions at the ends thereof rotatably mounted in the forks of said standard, a combined wheel brake and standard lock member mounted on said standard below said clutch surface for limited vertical movement, said member being normally out of engagement with said clutch face of said base member and the periphery of the wheel, rotation of the spindle on its eccentric portions in one direction acting to engage the wheel with the said member and through such engagement shift it into engagement with said clutch face of said base member, and an actuating member secured to one end of said spindle.

3. In a caster, the combination with a base member provided with an annular downwardly facing clutch surface, of a wheel, a wheel standard rotatably mounted on said base member, a spindle for said wheel eccentrically mounted on said standard for rotative adjustment thereon whereby the vertical relation of the wheel to the base member may be varied, and a combined brake and wheel standard lock member mounted on said standard in approximately vertical alignment with the spindle for limited vertical movement for engagement with the periphery of the wheel and the said base member clutch surface with the wheel standard in any angular position relative to the base member.

4. In a caster, the combination with a base member provided with an annular downwardly facing clutch surface, of a wheel, a wheel standard rotatably mounted on said base member, a spindle for said wheel eccentrically mounted on said standard for rotative adjustment thereon whereby the vertical relation of the wheel to the base member may be varied, and a combined brake and wheel standard lock member mounted on said standard for limited movement into and out of engagement with the periphery of the wheel and the said base member clutch surface.

5. In a caster, the combination with a base member, of a wheel, a wheel standard rotatably mounted on said base member, a wheel bearing adjustably mounted on said standard, a wheel brake and standard lock member mounted on said wheel standard for engagement with said wheel and base member, and means for adjusting said wheel bearing on said standard whereby the wheel may be shifted into braking engagement with said member and through the thrust of the wheel thereon the member is actuated into locking engagement with said base member.

6. In a caster, the combination with a base member, of a wheel standard rotatably mounted thereon, a wheel rotatably and adjustably mounted on said standard, a wheel brake and standard lock member mounted on said standard for engagement with said wheel and base member, and means for adjusting said wheel on said standard whereby the wheel may be shifted into engagement with said member and through the thrust of the wheel thereon said member is urged into locking engagement with said base member.

7. In a caster, the combination with a base member, of a wheel standard rotatably mounted thereon, a wheel mounted on said standard for adjustment towards and from said base member, and a wheel brake and standard lock member mounted on said standard in operative relation to both said wheel and base members to be simultaneously engaged or disengaged from both by the adjustment of said wheel on said standard.

PAUL H. SLEEPER.

REFERENCES CITED

The following references are of record in the file of this patent:

UNITED STATES PATENTS

| Number | Name | Date |
| --- | --- | --- |
| 1,778,167 | Roe | Oct. 14, 1930 |
| 2,288,155 | Ditchfield | June 30, 1942 |